Feb. 24, 1959 F. W. MINOR ET AL 2,875,167
PROCESS AND COMPOSITION FOR RENDERING FABRICS
RESISTANT TO THE PASSAGE OF TOXIC GASES
Filed May 17, 1956
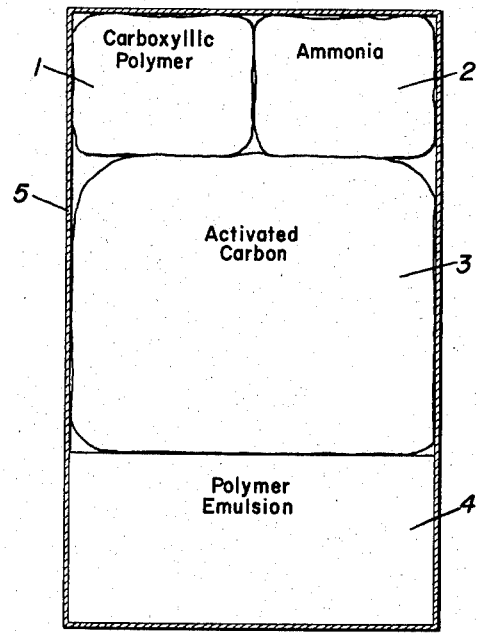
INVENTORS
Francis W. Minor
Anthony M. Schwartz
BY
ATTORNEY

United States Patent Office 2,875,167
Patented Feb. 24, 1959

2,875,167
PROCESS AND COMPOSITION FOR RENDERING FABRICS RESISTANT TO THE PASSAGE OF TOXIC GASES

Francis W. Minor, Arlington, Va., and Anthony M. Schwartz, Washington, D. C., assignors to the United States of America as represented by the Secretary of the Army Application May 17, 1956, Serial No. 585,583

4 Claims. (Cl. 260—29.7)

This invention relates to a composition for rendering cloth resistant to the passage of toxic agents, a process of treating cloth and a kit for use in carrying out the process.

The drawing shows a kit diagrammatically.

Our composition is characterized by: (1) being exceptionally easy to apply without the aid of mechanical equipment, (2) affording a highly effective barrier to passage of toxic gases, (3) being resistant to removal by dry abrasion or by wet abrasion in water, but, (4) being easily removable by laundering in aqueous alkaline solutions of soap or other detergents and, (5) affording an impregnated garment which is not unduly stiffened and which allows the free passage of air and water vapor, thus allowing the wearer to carry out his duties in normal comfort. We have also prepared a latex-type binder which has good stability when subjected to repeated freezing and thawing. This free-stable binder forms part of our kit.

The composition is an aqueous suspension of activated carbon, at least one polymeric carboxylic acid and at least one emulsified polymer.

Basically, the protection against poisonous gases is produced by the activated charcoal which should penetrate the fabric yarns, as well as the interyarn spaces, and which should be firmly bound to the fabric. We combine with the carbon (1) at least one polymeric carboxylic acid which is insoluble in water, but soluble in aqueous ammonia solution and which, after dissolution in aqueous ammonia, gives up ammonia on drying, leaving the water-insoluble acid and (2) an emulsified water-insoluble polymer, which forms the primary binder for the carbon. The carboxylic polymers perform several functions. They act as freeze-thaw stabilizers for the emulsified polymers. They serve to disperse the carbon and improve its penetration of the fabric. Finally, when used in sufficient proportion, they render the coating strippable from the fabric by laundering in an alkaline detergent solution. Since various carboxylic polymers vary in the effectiveness with which they perform the different functions we sometimes find it advisable to use more than one such substance in order to secure optimum results. (Our preferred embodiment, Example 2, illustrates this practice.)

These ingredients, charcoal, emulsified polymer and carboxylic polymers, are formed into an aqueous ammoniacal bath. The garments are impregnated by simply dipping them in the bath, wringing them, and allowing them to dry.

The various ingredients will now be discussed in more detail.

The charcoal must be very finely divided. A thorough penetration of the fabric yarns, as well as of the interyarn spaces, by the carbon particles is desirable for the following reasons: (1) It assures more uniform distribution of carbon over all three dimensions of the fabric. (2) It allows more carbon to be held by the fabric thus increasing the gas resistance. (3) It reduces the relative amount of carbon held on the surface thereby reducing rub-off and loss of gas resistance following rub-off. (4) It reduces the amount of binder necessary to hold the carbon, thereby affording lowered stiffness and higher air permeability, which are desirable characteristics from the standpoint of comfort. To assure good yarn penetration it is necessary to have the particles both small and well dispersed. Best results are achieved when the particles are in a size range less than about ⅕ the diameter of the fibers. That is, the maximum size should be not greater than about 5 microns. Such charcoal can be readily produced by grinding the carbon in a mill of the fluid energy type, in which material in gaseous suspension is carried in a tortuous or circular path while being subjected to high velocity fluid jets. (In practice, some tolerance may be allowed, up to about 1% by weight of particles larger than 5 microns being permissible.)

The dispersion of the charcoal is produced by the carboxylic polymers which also perform the additional functions given above. Examples of suitable compounds of this class are given in Table I.

TABLE I
*Polymeric carboxylic compounds*

| Class | Trade Name | Chemical Identity | Remarks |
|---|---|---|---|
| Partially esterified copolymers of styrene and maleic acid. | Lustrex 821 | Co-polymer of monosecondary butyl maleate and styrene, melting point 150-155° C. (see note 1). | Preferred dispersing agent. |
| Do | Lustrex 820 | Co-polymer of monosecondary butyl maleate and styrene (see note 2). | Preferred freeze-thaw stabilizer. |
| Maleic Acid-Rosin Condensates | | | Useful both as freeze-thaw stabilizer and as dispersing agent. |
| Copolymers of vinyl acetate and unsaturated acids. | Elchem 1273 (Elvadex 1273). | Copolymer of vinyl acetate and crotonic acid. | Dispersing agent. (Has also been used as a primary binder.) |
| Do | C5-V 10 | do | Do. |
| Salts of polymeric carboxylic acids. | | | Useful as dispersing agent and as freeze-thaw stabilizer. |

NOTES TO TABLE I

Note 1.—Lustrex 821 is further characterized by the viscosities of its ammoniacal solutions, as follows:

Solids, percent: Viscosity, cps., Brookfield
15 — 10
17 — 33
18 — 305
19 — 2300

(The viscosity of a polymer in solution is directly related to its molecular weight.)

Note 2.—Lustrex 820 decomposes at 210° C. and chars on prolonged exposure at 200-250° C. It is further characterized by the viscosities of its ammoniacal solutions, as follows:

Solids, percent: Viscosity, cps., Brookfield
5 — 2.8-4.0
10 — 200

The emulsified polymers which we employ form excellent binders for the charcoal and produce a material which has good flexibility. Emulsified polymers, or synthetic latices, which we have found suitable are listed in Table II.

TABLE II

*Emulsified polymers*

| Class | Trade Name | Chemical Identity | Remarks |
|---|---|---|---|
| Butadiene-Styrene Copolymer Latices. | Chemigum 101A (Pliolite 101A). | (See Note 1) | Preferred primary binder. |
| Butadiene-Acrylonitrile Copolymer Latices. | | | |
| Butadiene-Acrylonitrile | | | |
| Polyacrylate Emulsions | | | One of the superior primary binders. |
| Polyvinyl acetate emulsions | | | |
| Vinyl Pyridine-Styrene-Butadiene Copolymer Latices. | | | |

NOTE ON TABLE II

*Note 1.*—The detailed description of Pliolite 101A, as given by the manufacturer, is as follows:

| | |
|---|---|
| Polymer composition | 45/55 butadiene/styrene. |
| Solids content | 54 to 59%. |
| Polymer in solids | 96%. |
| Particle size | 2000 to 2500 Angstroms. |
| Stabilizer | Ammonia soap. |
| pH range | 10–12. |
| Surface tension | 30–40 dynes/cm. |
| Sp. grav. (dried solids) | 0.98. |
| Ash content | 1% max. |
| Solids per gallon | 4.6 lb. |
| Wt. per gal | 8.2 lb. |

These emulsions are all emulsions in water of the specified type of polymer containing a non-ionic or anionic type emulsifying agent. Emulsions containing cationic emulsifying agents have been found incompatible with the carboxylic polymers. The emulsions ordinarily contain about 50% solids. This amount is not critical, but should be taken into consideration in making up the composition.

The composition should contain from 5% to 25% by weight of charcoal, 10% to 15% being preferred. The ratio by weight of carbon to total polymer solids should be about 2:1 to 8:1, about 3:1 being preferred. The ratio of emulsion polymer solids to carboxylic polymer solids may vary from about 4:1 to 1:1.5. If the last-named ratio is too high, the coating will not be strippable by laundering in alkaline detergents. If it is too low, the binding of the carbon to the cloth is unsatisfactory and the texture of the cloth is poor, being harsh and uncomfortable to the skin. The manner of coating the cloth is as follows:

The carboxylic polymer is dissolved in water containing sufficient ammonia to produce dissolution of the polymer. The carbon is added and stirred until thoroughly dispersed. It has been found that the addition and dispersal of the carbon is facilitated if the charcoal contains from 30–32 percent moisture by weight. This range is rather critical. At 25% moisture, for example, the charcoal still tends to be dusty and is not readily wet, making mixing difficult. At higher moisture content (40% or more) it tends to be sensibly wet, making it difficult to pour. The 30–32% moisture content material pours readily, is practically free from dusting and is readily wet by water, making mixing easy. The emulsified polymer is then stirred into the bath.

Articles of clothing (jackets, trousers, underwear, socks, etc.) are immersed in the bath and thoroughly worked so as to saturate them with the composition. The thorough working is very important. It was found in an extensive series of trials that wringing is a particularly reproducible and effective form of mechanical working, and wringing is currently stressed in the impregnating procedure. After a garment has been thoroughly worked in the impregnating bath the final step before hanging the garment up to dry is to wring out the excess bath. If done under controlled conditions, the wringing may be carried out so as to give a "wet pick up" of about 150%, i. e., a ratio of composition retained to weight of dry cloth of about 1.5. In the field it is expedient to wring the garments by hand until no dripping occurs when they are hung up to dry. The latex is left unvulcanized.

The following examples illustrate our invention.

EXAMPLE 1

The composition is made up as follows:

| | Pounds |
|---|---|
| Water | 50 |
| 28% NH$_3$ solution | 2.9 |
| Lustrex 821 | 0.64 |
| Polyacrylate emulsion | 4.0 |
| Pulverized charcoal | 10.2 |

The ammonia is added to the water and the Lustrex is then dissolved therein. The charcoal is added and thoroughly mixed with the solution. The polyacrylate emulsion is added and stirred in. In this composition the weight ratio of emulsion polymer (polyacrylate) solids to carboxylic acid solids (Lustrex) is 3 to 1. The ratio of carbon to total polymer (polyacrylate and Lustrex) solids is 4 to 1. The charcoal amounts to 15% by weight of the total bath.

EXAMPLE 2

The following is the presently preferred embodiment of our invention. It is made up in the form of a kit for the field use of troops. As shown diagrammatically in the drawing, the kit contains four separate packages, as follows.

Package No. 1 is a kraft paper bag containing 2.8 lbs. of the dispersing agent, Lustrex 821 (see Table II).

Package No. 2 contains 12 fl. oz. 28–30% ammonia in glass ampoules.

Package No. 3 is a polyethylene-coated kraft paper bag containing 25.1 lb. activated charcoal, coal base; particle size, 99% by weight less than 5 microns; 30% moisture.

Package No. 4 is a metal can containing 10.1 lb. of a binder.

The binder has the following composition:

| | Percent |
|---|---|
| Pliolite 101A solids (see Table II) | 27.4 |
| Lustrex 820 (see Table I) | 3.4 |
| Ammonia, 28–30% | 10.7 |
| Distilled water to make 100%. | |

Pliolite 101A latex is made resistant to freezing by mixing it with an ammoniacal Lustrex 820 solution to form a mixture that contains 8 parts by weight of Pliolite 101A latex solids to 1 part of Lustrex 820 solids. The mixture also contains 3% by weight of ammonia (calculated as NH₃).

The desert, i. e. high temperature, storage stability is improved by maintaining the total solids in the stabilized latex in the neighborhood of 30%. The concentration of Lustrex 820 may vary somewhat from the value given, but should not exceed 10%. The lower concentration of Lustrex 820 in the solution, as given above, facilitates mixing and avoids clotting of the latex. The permissible range in the ratio of emulsion polymer solids to the carboxylic polymer solids is about 15:1 to 3:1 by weight.

The binder is prepared from the above ingredients by the following procedure.

[Basis: 100 lb. of binder.]

| | |
|---|---|
| Lustrex 820 | 3 lb. 7 oz. |
| Ammonia 28–30% | 10 lb. 9 oz. |
| Pliolite 101A (55% solids) | 50 lb. |
| Distilled water | 36 lb. |

Slurry the Lustrex 820 in 32 lb. of water at room temperature. While vigorously stirring the slurry, add approximately one third of the ammonia in small portions (1 to 2 oz.). (The stepwise addition of one third of the ammonia prevents lumping of the Lustrex 820 and very materially shortens the time required to prepare the solution.) Each portion of ammonia should be completely mixed with the slurry before adding the next portion. The remaining two thirds of the ammonia is then added in one portion. Add the Pliolite 101A latex and the remainder of the water to the Lustrex 820 solution and mix thoroughly. Protect from freezing for 24 hours after mixing.

The four packages and an instruction card giving the impregnating procedure are packed together in a fiber drum 5, to make a one-package set.

The method of preparation of the impregnating composition is as follows.

*Step I.—Preparation of dispersing agent solution*

(1) Add 12 gallons of water to the mixing tank.
(2) Add contents of package 1 (Lustrex 821) to a mixing tank and stir until the substance is completely wetted by the water and free from lumps.
(3) Add the ammonia (package 2) to the tank with vigorous stirring and continue stirring until the Lustrex is completely dissolved.

*Step II.—Dispersion of the charcoal*

(1) Add the contents of package 3 to the mixing tank with constant stirring.
(2) Continue to stir until all the charcoal has sunk below the surface and the mixture is free from lumps.

*Step III.—Addition of binder*

(1) Add the contents of package 4 to the mixing tank slowly and with constant stirring.
(2) Rinse out package 4 with 4.5 gallons of water and add the rinsings to the mixing tank. Continue stirring until a uniform mixture is obtained. The composition is then ready for use.

In this composition the binder comprises, by weight, 8 parts Pliolite 101A solids to 1 part Lustrex 820 and 8 parts Lustrex 821. Thus the ratio of emulsion polymer solids to carboxylic polymer solids is about 1 to 1.1. The ratio of carbon to total polymer solids is about 4 to 1. The carbon amounts to about 12.5 percent by weight of the total composition.

This preferred embodiment is an example of the practice, referred to earlier, of employing two different carboxylic polymers to impart the freeze-thaw stability to the latex and to act as a dispersing agent for the charcoal. While Lustrex 820 and Lustrex 821 are apparently formed from the same monomer, "820" has, as shown by the viscosity of its ammonia solutions, considerably higher molecular weight. While both are operative as freeze-thaw stabilizers and as dispersing agents, the "820" is superior as a freeze-thaw stabilizer and the "821" is superior as a dispersing agent. Accordingly, we provide, as indicated above, a butadiene-styrene polymer emulsion containing about 30% emulsified solids and containing Lustrex 820, the ratio of butadiene-styrene polymer to Lustrex 820 being about 8:1. This suspension is notably stable on repeated freezing and thawing and to storage at 160° F., as well as at ordinary temperatures. The Lustrex 821 is then added at the time the complete impregnating composition is made up, just prior to treating the clothing.

When a batch has been made up as described in detail above, the recommended method of impregnation is as follows. Place about 12 average sized garments, e. g., jackets and trousers, in the mix to soak. Squeeze each garment while it is immersed in the tank so that it becomes thoroughly wetted. Remove a garment from the tank and wring it by hand. Immerse and wring each garment three times. The final wringing should be continued until there is no drip from the garment. Straighten the garments and hang them up to dry. The garments are ready for wear when they are dry to the touch.

While we have described one embodiment in detail, it will be apparent that various changes may be made. We therefore wish our invention to be limited solely by the scope of the appended claims.

We claim:

1. A composition for rendering cloth resistant to toxic gases and liquids consisting essentially of an aqueous ammoniacal suspension of finely divided activated charcoal, an emulsified butadiene-styrene copolymer, and at least one copolymer of styrene and monosecondary butyl maleate, said charcoal constituting from 5 to 25 percent of said composition and consisting essentially of particles not substantially exceeding five microns diameter, the ratio of charcoal to total polymer solids being from 2:1 to 8:1 by weight and the ratio of said butadiene-styrene copolymer to said styrene-monosecondary butyl maleate copolymer being from 4:1 to 1:1.5 by weight, whereby cloth that has been impregnated with said composition and thereafter dried is resistant to dry abrasion and to wet abrasion with water but strippable by laundering in alkaline detergents.

2. An emulsion for use in preparing a composition for impregnating cloth comprising an aqueous ammoniacal suspension comprising approximately 30 percent of emulsified butadiene-styrene copolymer and a copolymer of styrene and monosecondary butyl maleate, the ratio of said first copolymer to said second copolymer being between 15:1 and 3:1, by weight.

3. A process of rendering cloth resistant to toxic gases and liquids which consists essentially of dipping said cloth in an aqueous ammoniacal suspension of finely divided activated charcoal, an emulsified butadiene-styrene copolymer, and at least one copolymer of styrene and monosecondary butyl maleate, said charcoal constituting from 5 to 25 percent by weight of said suspension, the ratio of charcoal to total polymer solids being from 2:1 to 8:1 by weight and the ratio of said butadiene-styrene copolymer solids to said styrene-monosecondary butyl maleate copolymer solids being from 4:1 to 1:1.5, wringing said cloth, and drying said cloth, whereby said cloth is resistant to dry abrasion and to wet abrasion with water but strippable by laundering in alkaline detergents.

4. An article of clothing, resistant to toxic gases and liquids, formed of cloth impregnated with finely divided activated charcoal, an unvulcanized butadiene-styrene copolymer, and at least one copolymer of styrene and monosecondary butyl maleate, the ratio of charcoal to total polymer solids being from 2:1 to 8:1 by weight and the ratio of butadiene-styrene copolymer solids to styrene-secondary butyl maleate copolymer solids being from 4:1 to 1:1.5 by weight, whereby said clothing is resistant to wet abrasion and to dry abrasion with water, but strippable by laundering with an alkaline detergent.

References Cited in the file of this patent

UNITED STATES PATENTS

| | | |
|---|---|---|
| 1,870,408 | Dreyfuss | Aug. 9, 1932 |
| 2,218,362 | Starkweather et al. | Oct. 15, 1940 |
| 2,439,442 | Amon | Apr. 13, 1948 |
| 2,476,819 | Dramon | July 19, 1949 |
| 2,481,532 | Pockel | Sept. 13, 1949 |
| 2,589,919 | Arundale et al. | Mar. 18, 1952 |
| 2,629,702 | Snyder | Feb. 24, 1953 |
| 2,769,713 | Wilson | Nov. 6, 1956 |
| 2,774,687 | Nottebohn et al. | Dec. 18, 1956 |

OTHER REFERENCES

"Chemical Warfare," by A. A. Fries et al., 1st ed., McGraw-Hill Book Co., N. Y., 1921, pp. 239, 272, 273, 274.

UNITED STATES PATENT OFFICE
CERTIFICATE OF CORRECTION

February 24, 1959

Patent No. 2,875,167

Francis W. Minor et al.

It is hereby certified that error appears in the printed specification of the above numbered patent requiring correction and that the said Letters Patent should read as corrected below.

Column 4, line 60, for "(see Table II)" read -- (see Table I) --.

Signed and sealed this 23rd day of June 1959.

(SEAL)
Attest:

ARL H. AXLINE
Attesting Officer

ROBERT C. WATSON
Commissioner of Patents